United States Patent
Smith

[11] Patent Number: 5,833,081
[45] Date of Patent: Nov. 10, 1998

[54] UNIVERSAL HANGER

[76] Inventor: Lawrence L. Smith, 1957 Old Conyers Rd., Stockbridge, Ga. 30281

[21] Appl. No.: 786,477

[22] Filed: Jan. 21, 1997

[51] Int. Cl.$^6$ ........................................................ A47F 5/00
[52] U.S. Cl. ........................ 211/86.01; 224/313; 211/207; 211/204
[58] Field of Search ................................... 211/207, 205, 211/196, 204, 86.01; 224/311, 313, 401; 248/200.1

[56] References Cited

U.S. PATENT DOCUMENTS

| | | |
|---|---|---|
| 466,940 | 1/1892 | Fowler et al. . |
| 1,639,551 | 9/1927 | Booth . |
| 1,905,596 | 4/1933 | Lewis . |
| 2,439,049 | 4/1948 | Lesko . |
| 2,494,318 | 1/1950 | Sturk ................................. 211/86.01 X |
| 2,794,217 | 6/1957 | Croft ..................................... 248/200.1 |
| 2,903,227 | 9/1959 | Key . |
| 2,991,040 | 4/1961 | Levy . |
| 3,123,219 | 3/1964 | Jones ................................. 211/86.01 X |
| 3,424,317 | 1/1969 | Singer ................................. 211/196 X |
| 3,481,483 | 12/1969 | Harvey et al. . |
| 3,507,402 | 4/1970 | Barbee ..................................... 211/204 |
| 3,807,574 | 4/1974 | Lanza ....................................... 211/207 |
| 4,209,099 | 6/1980 | Wickes . |
| 4,351,441 | 9/1982 | Schramm ................................. 211/207 |
| 4,778,089 | 10/1988 | White et al. . |
| 5,176,304 | 1/1993 | Palmer . |
| 5,219,080 | 6/1993 | Reyes ................................. 211/86.01 X |
| 5,303,832 | 4/1994 | Tu . |

FOREIGN PATENT DOCUMENTS

| | | | |
|---|---|---|---|
| 548222 | 11/1957 | Canada ................................. 248/200.1 |
| 2386290 | 12/1978 | France ..................................... 211/207 |

*Primary Examiner*—Peter M. Cuomo
*Assistant Examiner*—Janet M. Wilkens
*Attorney, Agent, or Firm*—Hinkle & Associates, P.C.

[57] ABSTRACT

A universal hanger 2 placed between opposed surfaces within a motor vehicle and provides temporary support of articles of clothing. The universal hanger comprises a crossbar 6 from which the articles can be hung, a pair of spaced apart head pads 14 extending outwardly from the crossbar for removably engaging one of the opposed surfaces, a shaft 26 pivotally mounted to the crossbar, a sectional rail 56 in longitudinal telescopic engagement with the shaft for longitudinal movement relative thereto, a foot pad 70 depending from the rail to removably engage the other opposed surface, and a spring 44 disposed within the shaft to enforce frictional engagement of the head and foot pads with the respective opposed surfaces. A kit for the universal hanger comprises the rail and a rack 5 having the crossbar and the shaft.

16 Claims, 2 Drawing Sheets

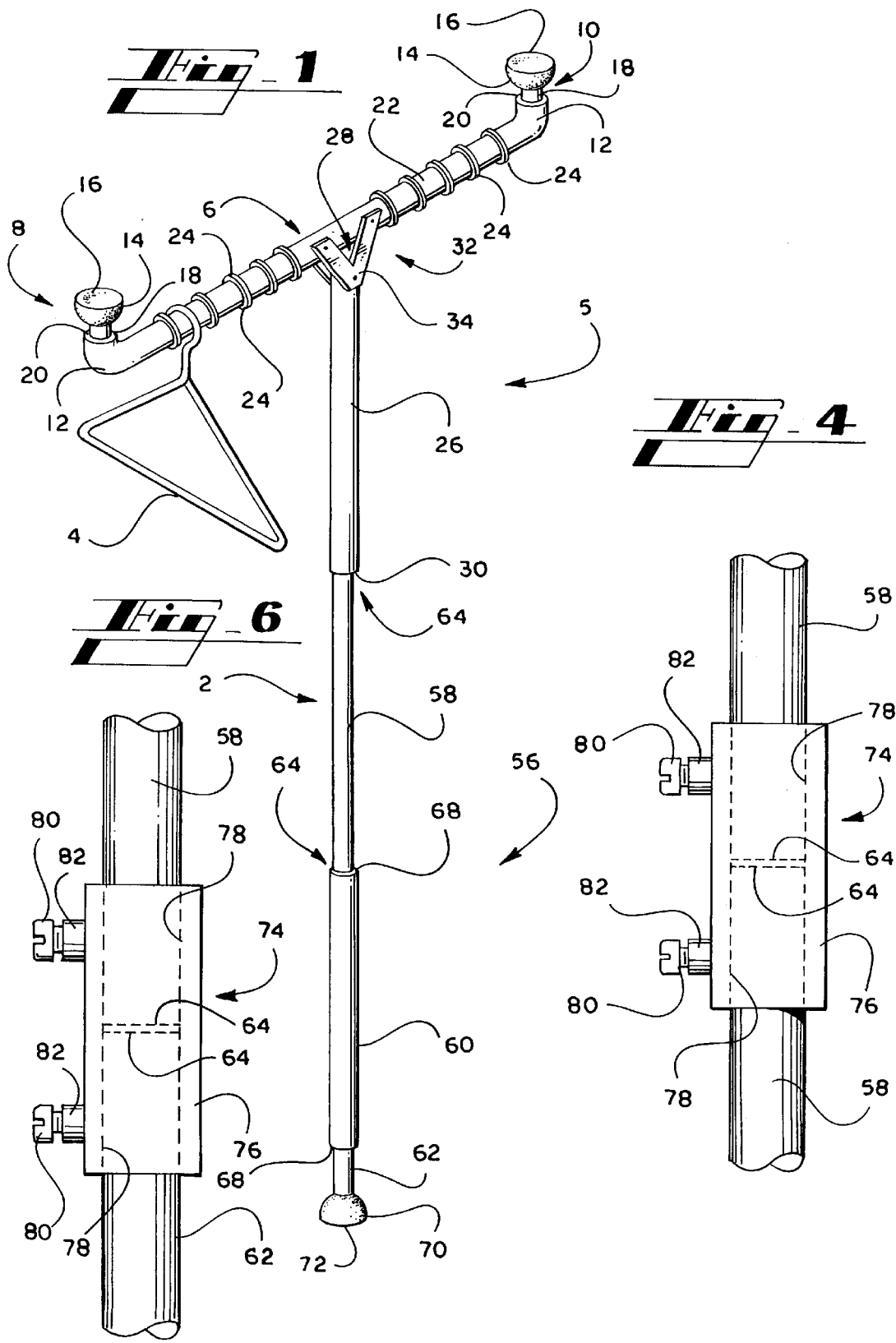

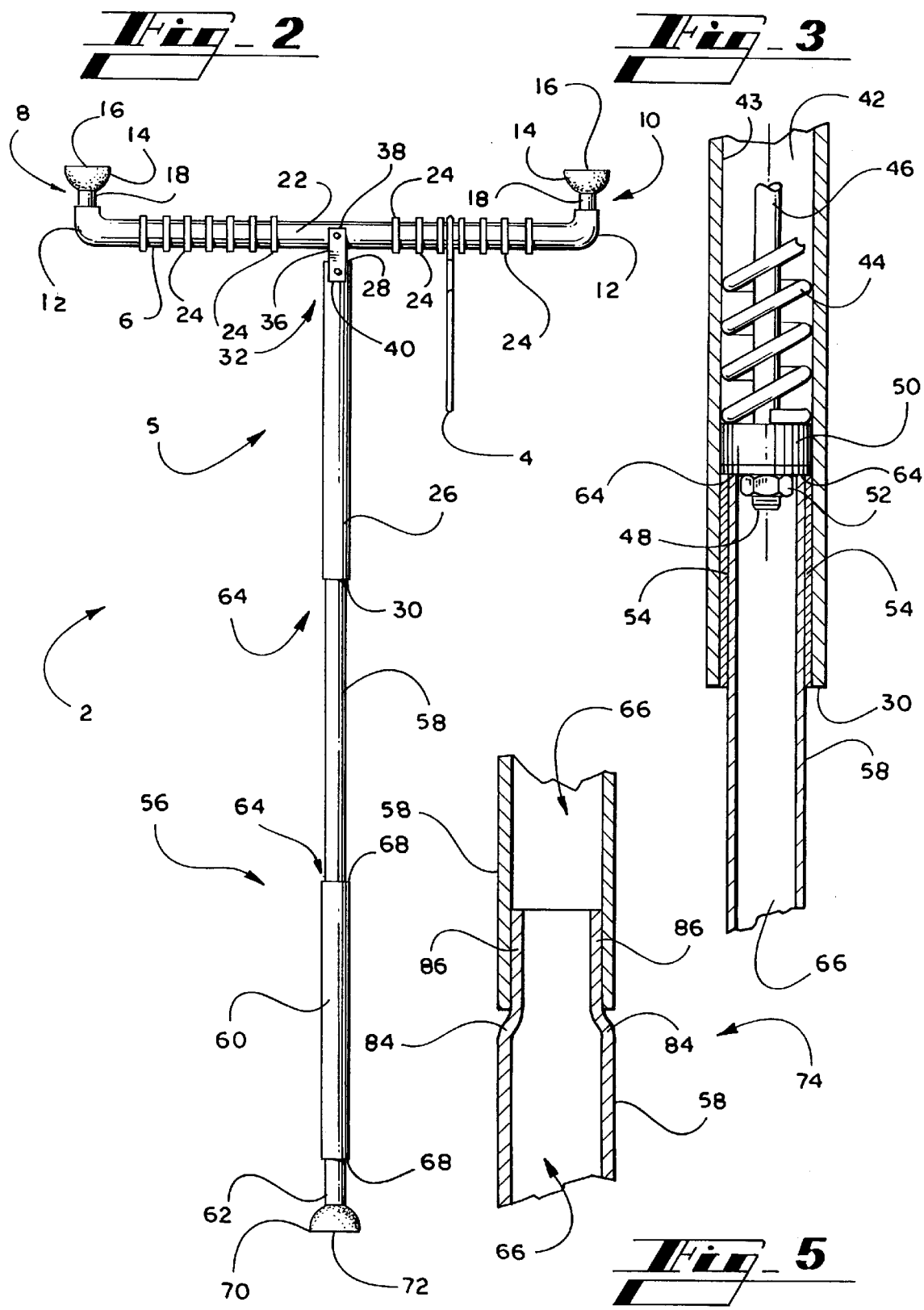

UNIVERSAL HANGER

BACKGROUND OF THE INVENTION

I. Field of the Invention.

The present invention relates generally to the field of clothing support devices. More particularly, the present invention relates to a universal hanger suited for use within a motor vehicle.

II. Description of the Related Art.

There are many devices known in the art from which an individual may suspend or hang articles of clothing. For example, it is well known to suspend a line from two spaced apart posts and hang laundered clothing for drying. Likewise, it is well known to suspend a stick between hooks or hand grips provided within a rear portion of a vehicle and hang clothing thereupon. However, both such devices are inadequate, because these devices occupy passenger space of the rear portion of the vehicle completely, block the view of a rear window through a rear view mirror when supporting clothing, place unnecessary physical stress upon the hooks or hand grips due to excessive weight and present an unsightly appearance within the vehicle.

U.S. Pat. No. 2,903,227 issued to de Kalb Key describes a Display Supporting Fixture. This device has a pair of telescopically interengaged tubular members that are positioned between and engage opposed surfaces. Along the length of the tubular members are uniformly spaced transverse apertures. The outer end of each member has a height adjustable suction cup to engage the adjacent surface. One of the members has a spring disposed therein to engage the other member and bias the members outwardly from each other. Removably mounted within the apertures are fixtures to support articles or merchandise.

A Display Stand described in U.S. Pat. No. 2,991,040 issued to Levy is designed to provide shelving space. The Display Stand has a pair of tubular sections of generally rectangular horizontal cross section telescopically engaging one another. At the outer most ends of the sections are pads to engage a floor and a ceiling, respectively. To bias the sections into frictional engagement with the floor and ceiling, a spring is disposed within one of the sections. Sets of the paired sections are arranged together so that shelve may be suspended from the sections.

Harvey et al. in U.S. Pat. No. 3,481,483 describes an Automobile Clothes Rack having inner and outer telescoping tubes with U-shaped clips disposed on the outer ends. The clips engage hooks provided in a rear seating section of a vehicle and suspend the tubes therebetween. At least one sheath having annular corrugations is disposed on the tubes to receive hangers. The corrugations are formed by an accordion configuration of the sheath.

An Automobile Clothes Hanger Bracket is described in U.S. Pat. No. 4,778,089 issued to White et al. which is suspended from a grab bar or a hook or both. A hanger arm or bar on which clothes hangers are hung has a pair of telescoping tubes. Disposed on the tubes are circumferential grooves to hold the hangers in place. To suspend this device from the grab bar in a rear seating area of a vehicle, the bracket has an L-shaped hook element to engage the grab bar and a pivotal bail which may be extended and hung on the hook.

SUMMARY OF THE INVENTION

In accordance with the present invention and the contemplated problems which have and continue to exist in this field, the objectives of this invention are to provide a universal hanger that provides a temporary platform for the hanging of garments within a motor vehicle.

Another objective of the present invention to provide a sectional rail to vary the height of the universal hanger.

Yet, another objective of the present invention is to provide a universal hanger that does not completely occupy a rear seating area of the vehicle.

Still yet, another objective of the present invention is to provide a kit for hanging articles within the vehicle.

This invention accomplishes the above and other objectives and overcomes the disadvantages of the prior art by providing a universal hanger that is simple in design and construction, inexpensive to fabricate, and easy to use. The universal hanger has an elongated shaft telescopically disposed upon a sectioned rail. The rail length may be adjusted for varying floor to ceiling distances of different vehicles by adding or removing segments. At the bottom of the rail is a foot pad and at the top of the shaft is a crossbar with a pair of head pads mounted at the opposite ends of the crossbar. The crossbar is pivotally mounted on the shaft for compact storage of the Universal Hanger when not in use. A spring engages the rail and the shaft to bias the head and the foot distally from each other. Along the crossbar are spaced apart, annular projections to prevent hanging objects from sliding along the crossbar. In use, the foot pad engages the floor or a seat and the head pads engage the ceiling of the vehicle.

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Other objects, advantages and capabilities of the invention will become apparent from the following description taken in conjunction with the accompanying drawings showing the preferred embodiment of the invention.

BRIEF DESCRIPTION OF THE DRAWINGS

The invention will be better understood and the above objects as well as objects other than those set forth above will become apparent when consideration is given to the following detailed description thereof. Such description makes reference to the annexed drawings wherein:

FIG. 1 is a perspective view of the present invention utilizing a V-shaped bracket;

FIG. 2 is a front elevation view of the invention of FIG. 1 utilizing an I-shaped bracket;

FIG. 3 is a partial, cross sectional view of a spring of the present invention;

FIG. 4 is a sectional view of one embodiment of a connector of the present invention; and FIG. 5 is a partial cross sectional view of another embodiment of the connector of the present invention; and FIG. 6 is a sectional view of the connector of FIG. 4 removably engaging a first section and a post.

DESCRIPTION OF THE PREFERRED EMBODIMENTS

For a fuller understanding of the nature and desired objects of this invention, reference should be made to the following detailed description taken in connection with the accompanying drawings. Referring to the drawings wherein like reference numerals designate corresponding parts throughout the several figures, reference is made first to FIG. 1. FIG. 1 of the drawings illustrates an embodiment of a universal hanger 2 constructed in accordance with the present invention with a clothes hanger 4 suspended therefrom. The present invention is well suited to be a temporary hanging unit for articles of clothing in a motor vehicle (not shown) that does not completely occupy a rear seating section (not shown) of the vehicle. It is suited as well for use in a structure (not shown) to add additional hanging space for the articles. When placed within the motor vehicle or the structure, the universal hanger 2 engages surfaces opposed to one another, for example a floor (not shown) and the roof (not shown), and provides a platform from which the articles may be hung.

The universal hanger 2 has a rack 5, and the primary support of the rack 5 is a cylindrically-shaped, tubular crossbar 6 having a longitudinal axis. Although shown having a cylindrical-shape, the crossbar 6 can be constructed having a cross-section of any desire shape, such as rectangular, square, triangular and the like. Additionally, it is not required for the crossbar 6 to be hollow and it can be fabricated as a solid member. The crossbar 6 has a first crossbar end 8 and a second crossbar end 10. Proximate the first and second crossbar ends 8 and 10, the crossbar 6 has bends 12 that form substantially ninety degree angles in relation to the longitudinal axis of the crossbar 6. Extending outwardly from each of the first and second crossbar ends 8 and 10 are head pads 14, respectively. Each head pad 14 has a substantially planar head pad surface 16. In one embodiment, the head pad 14 is mounted to a tubular stub 18 having a smaller external diameter than the internal diameter of the crossbar 6. At the first and second crossbar ends 8 and 10, the crossbar 6 has an aperture 20, and the stub 18 is removably mounted to the crossbar 6 by inserting the stub 18 into the aperture 20. The stub 18 also can be permanently mounted to the crossbar 6 within the aperture 20. The crossbar 6 has a crossbar surface 22 and disposed along the crossbar surface 22 are a plurality of annular projections 24 extending outwardly from the crossbar 6 to restrain clothes hangers 4 from movement along the crossbar surface 22. In the preferred embodiment, the projections 24 are movable from one location to another along the crossbar 6 and made of a pliable and resilient material, such as plastic and rubber.

Next, the rack 5 comprises a cylindrically-shaped, tubular shaft 26 having a first shaft end 28 and a second shaft end 30. The shaft 26 is pivotally mounted to the crossbar 6 proximately midway between the first and second crossbar ends 8 and 10 by a bracket 32. In this configuration the crossbar 6 pivots about the shaft 26 to become substantially parallel to the shaft 26 to provide convenient storage capability. As shown in FIG. 1, the bracket is a V-shaped bracket 34. Referring now to FIG. 2, the bracket is shown as an I-shaped bracket 36. The I-shaped bracket 36 has a top end 38 and a bottom end 40. As previously indicated, the I-shaped bracket 36 is pivotally mounted to the shaft 26 proximate the first shaft end 28 at the bottom end 40. Additionally, the I-shaped bracket 36 can also be pivotally mounted to the crossbar 6 at the top end 38 to provide an articulated movement of the crossbar 6.

As shown in FIG. 3, the shaft 26 has a shaft bore 42 and an inner shaft wall 43. Located within the shaft bore 42 is a spring 44. Disposed through the spring 44 is a dowel 46 having screw threaded ends 48. Although being shown in partial view, the spring 44 is maintained within the shaft 26 at the first and second shaft ends 28 and 30 in a like manner. A retainer 50, such as a washer, is placed onto the dowel 46 and in contact with the spring 44. Further, the retainer 50 slidingly engages the shaft wall 43. Locking the spring 44 and the retainer 50 onto the dowel 46 is a nut 52 that is screwed onto the threaded end 48. The nuts 52 proximate the first and second shaft ends 28 and 30 are tightened so that the retainers 50 maintain firm contact with the spring 44. Proximate the first and second shaft ends 28 and 30 are stops 54. In one embodiment the stop 54 is a ridge (not shown) that projects outwardly from the shaft wall 43 to engage the retainer 50. Preferably, as shown in FIG. 3, the stop 54 is a plastic strip which is affixed to the shaft wall 43 and engages the retainer 50. In another embodiment the spring 44 is solely disposed in the shaft bore 42 and retained therein by the spring 44 engaging the stops 54 located at the first and second shaft ends 28 and 30.

All features of the crossbar 6 and the pivotally mounted shaft 26 described above comprise the rack 5.

A sectional rail 56 is provided to add height to the universal hanger 2 for accommodating varying distances between the opposed surfaces of different motor vehicles or structures. Comprising the rail 56 is a tubular first section 58, a tubular second section 60 and a post 62. To provide telescopic arrangement with the shaft 26, the first section 58 has an outside diameter that is less than the inside diameter of the shaft 26. The first section 58 has first section ends 64 and, as shown in FIGS. 3 through 5, a cavity 66. The first section 58 is inserted into the shaft 26 at the second shaft end 30 so that one of the first section ends 64 is placed into engagement with the retainer 50. This results in the spring 44 operably engaging the first section 58 to resiliently bias the shaft 26 and the first section 58 in the longitudinal direction tending to increase the overall length thereof. Also, the first section ends 64 can have a first section end cap (not shown) that covers the first section ends 64 to engage either the spring 44, which is retained only by the stops 54, or the retainer 50.

The second section 60 has second section ends 68 and is configured internally in the same manner as the shaft 26, as shown in FIG. 3 and as described above. The second section 60 has a second section bore (not shown) and an inner second section wall (not shown). Located within the second section bore is another spring 44. Disposed through the spring 44 is the dowel 46. The spring 44 is maintained within the second section 60 at the second section ends 68 in a like manner. The retainer 50 is placed onto the dowel 46 and in contact with the spring 44. Further, the retainer 50 slidingly engages the second section wall. Locking the spring 44 and the retainer 50 onto the dowel 46 is a nut 52 that is screwed onto the threaded end 48. The nuts 52 proximate the second section ends 68 are tightened so that the retainers 50 maintain firm contact with the spring 44. Likewise, proximate the second section ends 68 are stops 54. As with the shaft 26, the spring 44 can be solely disposed in the second section bore and retained therein by the stops 54 located proximate the second section ends 68, respectively. Preferably, the second section 60 has the same inside diameter as the shaft 26. The first section 58 engages the second section 60 in the same manner as the first section 58 engages the shaft 26, shown in FIG. 3 and described above. That is, the other first section end 64 is inserted into one of the second section ends 68 to engage one of the retainers 50.

To complete the rail 56, one end of the post 62 is inserted into the other second section end 68 and engages the other retainer 50, again in the same manner as shown in FIG. 3 and described above. It is preferred for the outside diameter of the post 62 to be the same as the outside diameter of the first section 58. Depending from the other end of the post 62 is foot pad 70 having a substantially planar foot pad surface 72. Also as provided with the first section 64, the post 62 can have a post cap (not shown) across the opposite end of the post 62 from the foot pad 70 for engaging either the solely disposed spring 44 in the shaft 26 or the second section 60 or the retainer 50.

Should the universal hanger 2 need additional height to engage the opposed surfaces, one or more additional first sections 58 may be added with the use of a connector 74. Referring to FIG. 4, one embodiment of the connector 74 is a tubular spool 76 having a spool bore 78 aligned along the longitudinal axis, a pair of thumb screws 80, a pair of spaced apart stands 82 extending outwardly from the spool 76 along a lateral axis and threaded thumb screw bores (not shown) disposed through the stands 82 and intersecting the spool bore 78. The thumb screws 80 matingly engage the thumb screw bores. In use, first sections 58 are inserted into the spool bore 78 so that the first section ends 64 of the first sections 58 being connected opposed one another. The thumb screws 80 are rotated into contact with and frictionally engage the respective first sections 58 to retain them within the spool bore 78.

Referring to FIG. 5, another embodiment of the connector 74 is a reducer 84 located at the first section end 64. The reducer 84 tapers inwardly and along a longitudinal axis of the first section 58 to form an insert 86. To connect the respective first sections 58, the insert 86 is placed into the cavity 66 of another first section 58.

Now, referring to FIG. 6, with continuing reference to FIG. 1, the use of the second section 60 may not be necessary or feasible under certain circumstances, yet a first section 58 may be needed. Therefore, the connector 74 may be utilized to connect the first section 58 with the post 62.

In operation, the universal hanger 2 is placed between the two opposed surfaces. The head pad surfaces 16 frictionally engage one of the opposed surfaces while the foot pad surface 72 engages the other opposed surface. As long as the height of the universal hanger 2 is greater than the distance between the opposed surfaces, frictional engagement of the head and foot pad surfaces 16 and 72 with the opposed surfaces is maintained by the spring 44 within the shaft 26. Should one or more second sections 60 be added to the rail 56, the springs 44 within the second sections 60 also add additional bias to maintain frictional engagement of the head and foot pad surfaces 16 and 72 with the opposed surfaces.

As with the crossbar 6, the shaft 26, the first section 58, the second section 60 and the post 62 can be constructed having a cross-section of any desired shape, such as rectangular, square, triangular and the like.

The universal hanger 2 is capable of being distributed as a kit for hanging articles within the motor vehicle. Contained within the kit is the rack 5, the rail 56 and at least one connector 74.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A universal hanger adapted for positioning between and in engagement with substantially opposed surfaces, the universal hanger comprising:

a crossbar for receiving articles thereon;

a pair of spaced apart head pads extending outwardly from the crossbar for removably engaging one of the opposed surfaces;

a hollow shaft pivotally mounted to the crossbar, the shaft having a first shaft end, a second shaft end and being pivotally mounted to the crossbar proximate the first shaft end;

a rail in longitudinal telescopic engagement with the shaft for longitudinal movement relative thereto;

a foot pad depending from the rail to removably engage the other opposed surface;

a spring being disposed within the shaft and engaging the rail to resiliently bias the shaft and the rail in the longitudinal direction tending to increase the overall length thereof and enforce frictional engagement of the head and foot pads with the respective opposed surfaces;

wherein the rail further comprises a first section having one end inserted into the second shaft end to removably engage the spring;

a hollow second section having another spring disposed therein, the other end of the first section inserted into and removably engaging the spring of the second section; and a post extending from the foot pad, the post inserted into the second section to removably engage the spring of the second section from a direction opposite the first section.

2. A hanger as claimed in claim 1, wherein the crossbar has a first end and a second end and the head pads are proximate the first and second ends, respectively.

3. A hanger as claimed in claim 1, further comprising:

a connector disposed between the first section and the second section and removably mounted to the other end of the first section; and another first section disposed between the connector and the second section, one end of the another first section removably mounted to the connector and the other end of the another first section inserted into and removably engaging the spring of the second section.

4. A hanger as claimed in claim 1, wherein the crossbar has a crossbar surface and the crossbar surface has at least one annular projection.

5. A hanger as claimed in claim 1, wherein the shaft is pivotally mounted to the crossbar by a bracket.

6. A hanger as claimed in claim 5, wherein the bracket is a V-shaped bracket.

7. A hanger as claimed in claim 5, wherein the bracket is an I-shaped bracket.

8. A universal hanger adapted for positioning between and in engagement with substantially opposed surfaces, the universal hanger comprising:

a crossbar for receiving articles thereon;

a pair of spaced apart head pads extending outwardly from the crossbar for removably engaging one of the opposed surfaces;

a hollow shaft pivotally mounted to the crossbar, the shaft having a first shaft end, a second shaft end and being pivotally mounted to the crossbar proximate the first shaft end;

a rail in longitudinal telescopic engagement with the shaft for longitudinal movement relative thereto;

a foot pad depending from the rail to removably engage the other opposed surface;

a spring being disposed within the shaft and engaging the rail to resiliently bias the shaft and the rail in the longitudinal direction tending to increase the overall length thereof and enforce frictional engagement of the head and foot pads with the respective opposed surfaces;

wherein the rail comprises a first section having one end inserted into the second shaft end and engaging the spring;

a post extending from the foot pad; and a connector removably engaging the other end of the first section and the post, the connector having a spool bore therethrough and the respective end of the first section and the post being oppositely and removably disposed in the spool bore.

9. A kit for a universal hanger to receive hanging articles within a motor vehicle, comprising:

a rack;

a hollow shaft, the shaft having a spring disposed therein;

a first section having one end insertable into the shaft to removably engage the spring;

a hollow second section having another spring disposed therein, the other end of the first section insertable into and removably engaging the spring of the second section; and a foot pad, the foot pad having a post extending therefrom and being alternatively insertable into either the second section from a direction opposite the first section or the shaft to removably engage the respective spring.

10. A kit as claimed in claim 9, wherein the rack comprises:

a crossbar for receiving articles thereon, the crossbar having the shaft pivotally mounted thereto; and a pair of spaced apart head pads extending outwardly from the crossbar.

11. A kit as claimed in claim 10, wherein the crossbar has a crossbar surface and the crossbar surface has at least one annular projection.

12. A kit as claimed in claim 10, wherein the shaft is pivotally mounted to the crossbar by a bracket.

13. A kit as claimed in claim 12, wherein the bracket is a V-shaped bracket.

14. A kit as claimed in claim 12, wherein the bracket is an I-shaped bracket.

15. A kit as claimed in claim 9, further comprising a connector.

16. A kit as claimed in claim 15, further comprising at least two first sections.

* * * * *